United States Patent [19]

Kawai

[11] Patent Number: 4,959,735
[45] Date of Patent: Sep. 25, 1990

[54] RECORDING APPARATUS WITH REMAINING TIME INDICATION DISPLAY

[75] Inventor: Hisashi Kawai, Kanagawa, Japan

[73] Assignee: Canon Kabushiki Kaisha, Tokyo, Japan

[21] Appl. No.: 432,567

[22] Filed: Nov. 7, 1989

Related U.S. Application Data

[63] Continuation of Ser. No. 159,232, Feb. 23, 1988, abandoned.

[30] Foreign Application Priority Data

Feb. 24, 1987 [JP] Japan ................................ 62-041863

[51] Int. Cl.$^5$ ............................................. H04N 5/76
[52] U.S. Cl. .................................. 358/342; 360/33.1; 360/137; 358/906
[58] Field of Search ..................... 360/33.1, 35.1, 19.1, 360/137; 369/19, 54, 58; 358/310, 311, 335, 342, 341, 343

[56] References Cited

U.S. PATENT DOCUMENTS

| | | | |
|---|---|---|---|
| 4,206,483 | 6/1980 | Nakamura | 360/33.1 |
| 4,338,645 | 7/1982 | Mohri et al. | 360/137 |
| 4,398,279 | 8/1983 | Titus et al. | 369/58 |
| 4,399,527 | 8/1983 | Titus et al. | 369/58 |
| 4,423,455 | 12/1983 | Fukuoka | 360/137 |
| 4,479,159 | 10/1984 | Kamei et al. | 360/137 |
| 4,532,560 | 7/1985 | Williams | 360/137 |
| 4,638,394 | 1/1987 | Hayakawa | 360/137 |
| 4,644,436 | 2/1987 | Unno | 360/137 |
| 4,688,117 | 8/1987 | Dwyer et al. | 360/137 |
| 4,727,446 | 2/1988 | Kaaden | 360/137 |
| 4,858,031 | 8/1989 | Fukuta | 358/342 |

Primary Examiner—Donald McElheny, Jr.
Attorney, Agent, or Firm—Robin, Blecker, Daley & Driscoll

[57] ABSTRACT

In a recording apparatus having different modes of recording on a recording medium including a first recording mode in which at least information on sounds is recorded and a second recording mode in which information other than information on sounds is recorded, the amount of room remaining for recording on the medium is detected; and control means is arranged to change the mode of displaying the detected remaining amount of room for recording according to a selection made between the first and second recording modes.

25 Claims, 12 Drawing Sheets

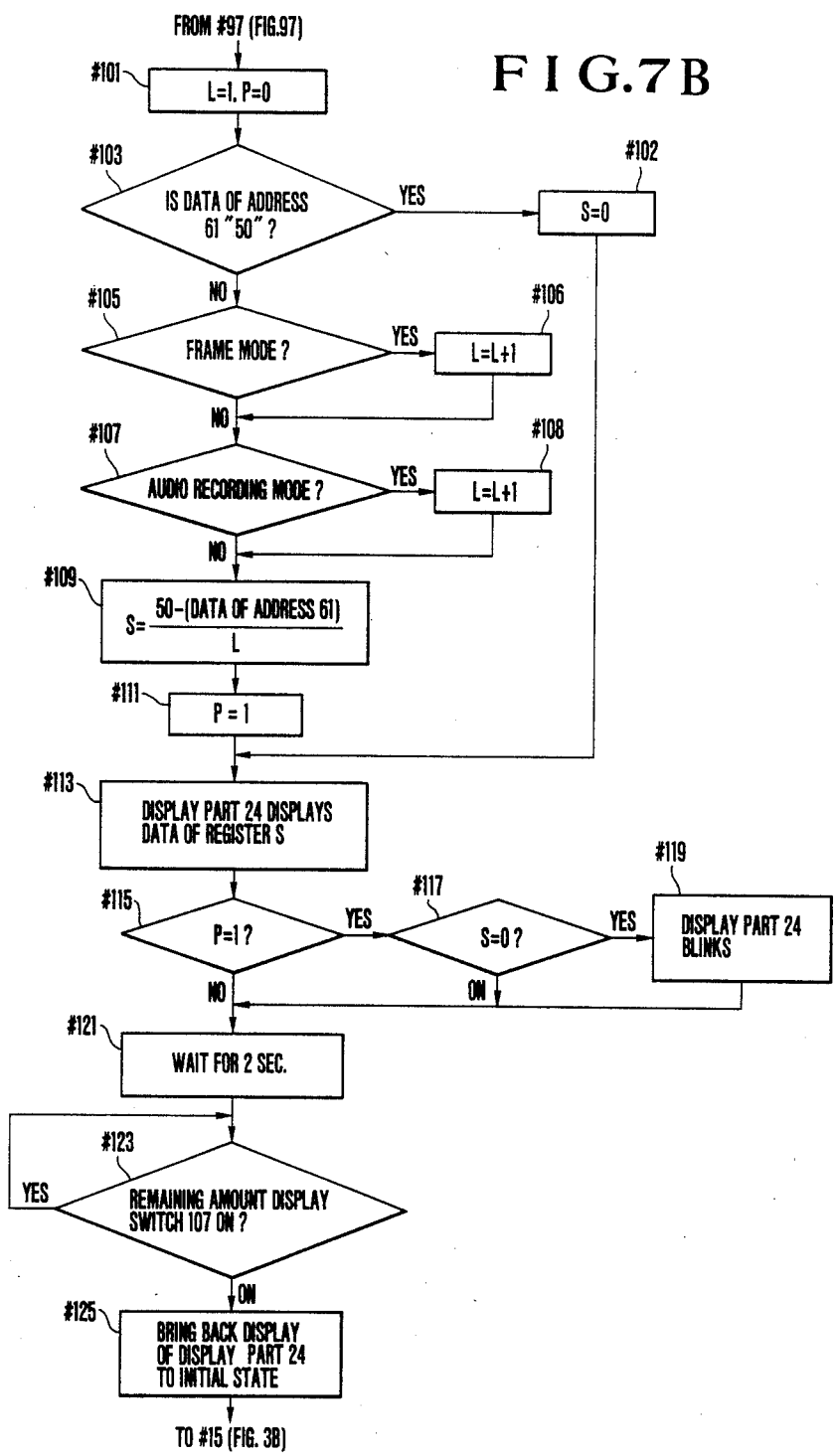

WHERE THE NUMBER OF REMAINING TRACKS IS 24 OR 25

WHERE THE NUMBER OF REMAINING TRACKS IS 24

WHERE THE NUMBER OF REMAINING TRACKS IS 24 OR 25

WHERE THE NUMBER OF REMAINING TRACKS IS 24 TO 26

WHERE THE NUMBER OF REMAINING TRACKS IS 1

WHERE THE NUMBER OF REMAINING TRACKS IS 1

WHERE THE NUMBER OF REMAINING TRACKS IS 2

WHERE THE NUMBER OF REMAINING TRACKS IS 2

RECORDING APPARATUS WITH REMAINING TIME INDICATION DISPLAY

This application is a continuation of application Ser. No. 159,232, filed Feb. 23, 1988 abandoned.

BACKGROUND OF THE INVENTION

1. Field of the Invention:

This invention relates to a recording apparatus and more particularly to a recording apparatus which is capable of recording audio information.

2. Description of the Related Art:

Recording apparatuses of the kind arranged to be capable of recording both audio and video signals have been known. One example of them has been disclosed in Japanese Patent Application Laid-Open No. SHO 58-108882.

The conventional recording apparatus of this kind, however, has not been arranged to allow the operator to readily know how much room is left on a recording medium for recording the audio or video signal. This drawback has impaired the operability of the apparatus.

To solve this problem, the applicant of the present application has previously proposed a device for informing the operator of an amount of room left on a recording medium for recording video signals. However, in recording something other than video signals, such as audio signals, this device has not been arranged to adequately allow the operator to know the amount of room left for recording on the recording medium.

SUMMARY OF THE INVENTION

It is a general object of this invention to provide a recording apparatus which is capable of solving the above stated problem of the prior art device.

It is a more specific object of this invention to provide a recording apparatus which is capable of varying the mode of displaying the recordable amount of room left on a recording medium in accordance with a recording mode selected.

It is another object of this invention to provide a recording apparatus of the kind having selectable recording modes including a mode of recording an audio signal only and another mode of recording both audio and video signals, said apparatus being arranged to be capable of varying the mode of displaying the recordable amount of room left on a recording medium in accordance with the recording mode selected.

Under this object, a recording apparatus which is arranged as a preferred embodiment of this invention and has selectable recording modes including a first mode of recording on a recording medium at least sound information or audio signals and a second mode of recording information other than the sound information comprises: detecting means for detecting an amount of room left on the medium for recording; and control means for varying the mode of displaying the recordable amount of room left on the medium in accordance with a selection made between the first and second modes.

It is a further object of this invention to provide a recording apparatus which is capable of efficiently displaying information of a plurality of kinds relative to recording performed by the apparatus.

It is a still further object of this invention to provide a recording apparatus which is capable of efficiently displaying a recordable length of time.

These and other objects and features of this invention will become apparent from the following detailed description of embodiments thereof taken in connection with the accompanying drawings.

BRIEF DESCRIPTION OF THE DRAWINGS

FIGS. 7A and 7B are flow charts showing execution by the main controllers 20 of steps branched out from a step #14-2 shown in FIG. 3B. FIGS. 7C-1 to 7C-8 show examples of displays made by the display part 24 when the flows of FIGS. 7A and 7B are executed.

DETAILED DESCRIPTION OF THE PREFERRED EMBODIMENTS

In the following description of an embodiment, this invention is applied to a recording apparatus which is arranged either to record one field portion of a video signal or a given length, about 20 sec for example, of an audio signal in each of tracks concentrically formed on a disc-shaped recording medium. However, it should be understood that this invention is not limited to the apparatuses of that kind but is of course applicable to the recording apparatuses of other kinds using a recording medium of a different shape and recording in accordance with a different format.

Figure 1:
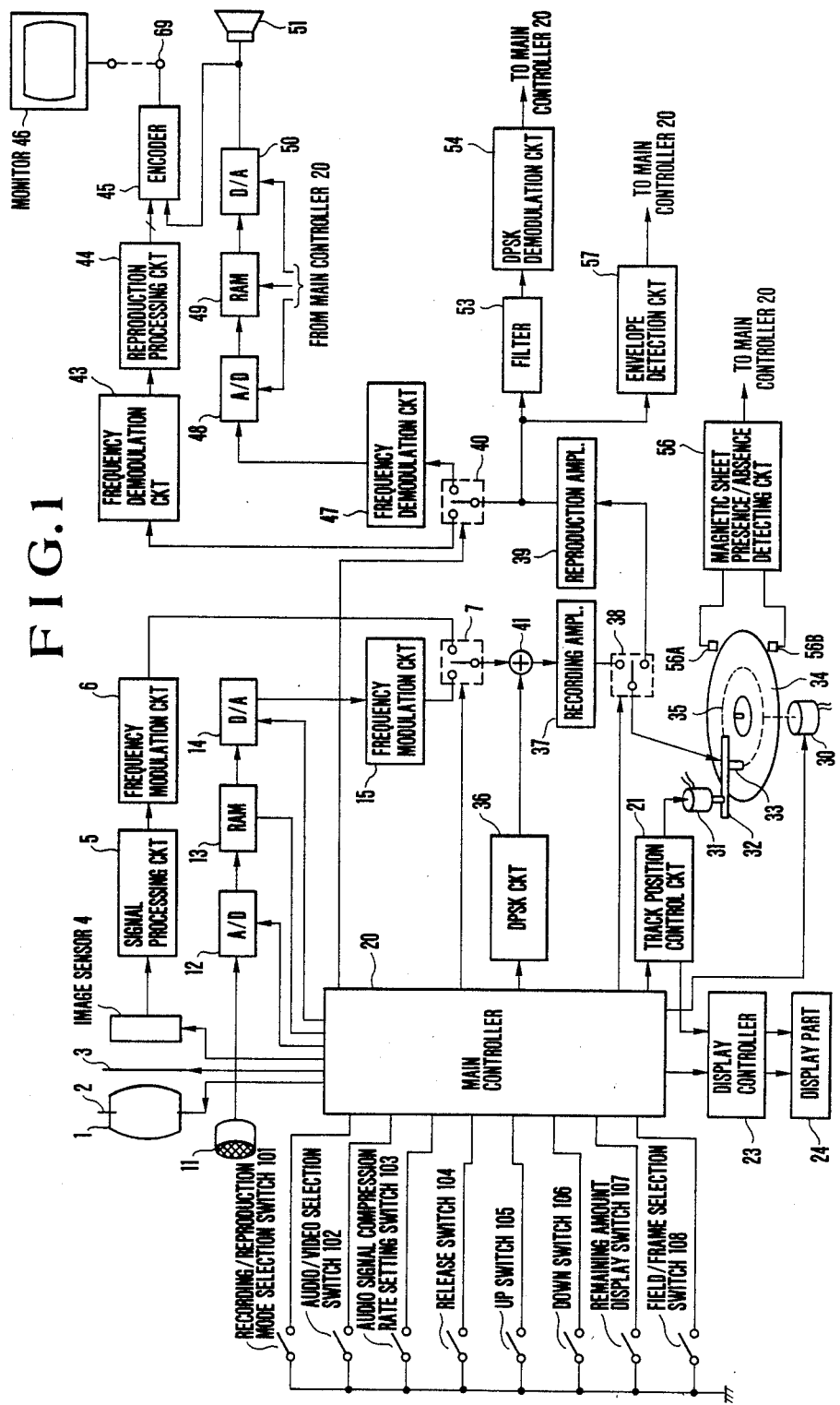
FIG. 1 is a block diagram showing an embodiment of this invention.
Figure 2:
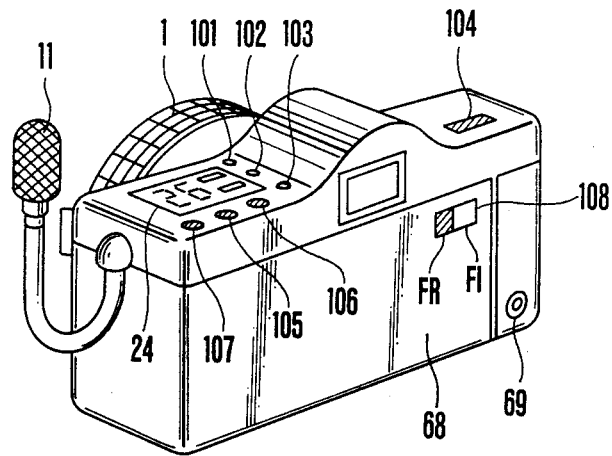
FIG. 2 is an oblique view showing the appearance of the embodiment shown in FIG. 1.

FIG. 1 shows an embodiment of this invention in a block diagram and FIG. 2 the appearance thereof in an oblique view. These illustrations include the lens 1 of a camera; a diaphragm 2 of the lens; a shutter 3; a solid state image sensor 4 which is arranged to photoelectrically convert a light flux incident thereon bearing the image of an object to be photographed; a signal processing circuit 5 which is arranged to perform a clamp process, color separation process, etc. on a signal produced from the image sensor 4; a frequency modulation circuit 6 which is arranged to frequency modulate the signal processed by the signal processing circuit 5; a switch circuit 7 which is arranged to selectively supply to a head 33 either the output of the frequency modulation circuit 6 or that of another frequency modulation circuit 15 according to a signal produced from a main controller 20; a microphone 11 which is arranged to obtain sounds; a converter 12 which is arranged to analog-to-digital (A/D) convert the sounds thus obtained; and a RAM 13 which is provided for time-base compression and is arranged to permit reading and writing under the control of the main controller 20. The above stated time base compression is arranged to be carried out by changing the speed of the writing and reading actions on the RAM 13. A converter 14 is arranged to digital-to-analog (D/A) convert the output of the RAM 13. The frequency modulation (FM) circuit 15 is arranged to frequency modulate the output of the D/A converter 14. The switch circuit 7 selects the video signal or the audio signal under the control of the main controller 20. The main controller 20 is arranged to control the diaphragm device 2, the shutter 3, the RAM 13; the switch circuits 7, 38 and 40, a track position control circuit 21, a display controller 23, a motor 30 and other circuit elements according to steps of operation shown in the flow charts which will be described later herein. The track position control circuit 21 is arranged to control the access position of the head 33 by controlling the rotation of the motor 31 in accordance with the instruction of the main controller 20.

Figure 4:
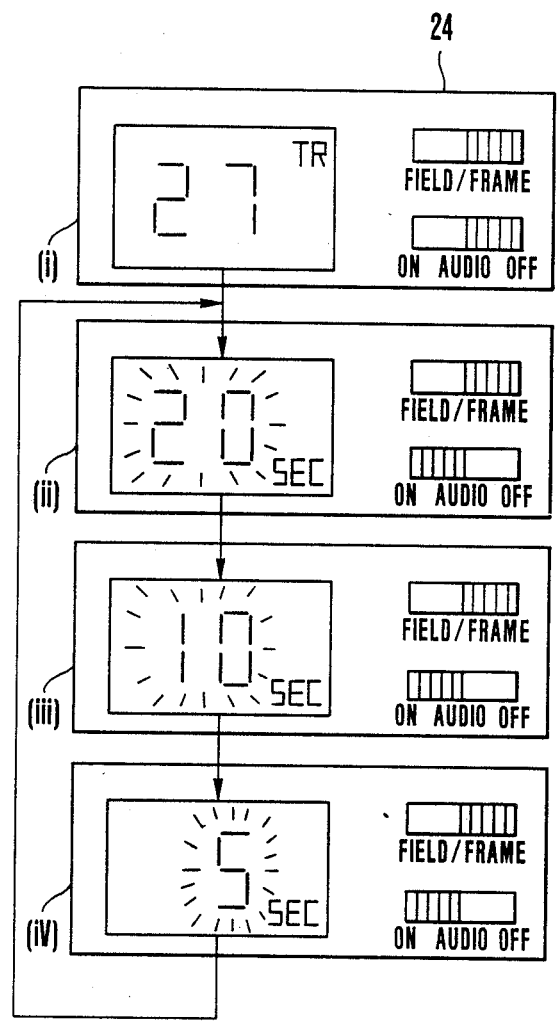
FIG. 4 is a plan view showing a first example of displays made by a display part 24 included in FIG. 1.

A display controller 23 is arranged to drive a display part 24 according to a signal produced from the main controller 20. The display controller 23 causes the display part 24 normally to make a display as shown in FIG. 4. In the case of a display mode of displaying a remaining amount of room for recording a video signal only, the display controller 23 causes the display part 24 to make one of such displays that are as represented by FIGS. 7C-1, 7C-2, 7C-5 and 7C-6. In recording an audio signal, the display controller 23 causes the display part 24 to make one of such displays that are as represented by FIGS. 7C-3, 7C-4, 7C-7 and 7C-8.

The display part 24 is disposed on the upper side of a recording apparatus which is in a camera-like shape as shown in FIG. 2.

The motor 30 is arranged to cause a magnetic sheet 34 to rotate. Another motor 31 is arranged to be driven by the track position control circuit 21. A rack 32 is arranged to engage the gear of the motor 31. The head 33 is mounted on the rack 32 and is arranged to record on the magnetic sheet 34 the signals coming thereto via the switch circuits 7 and 38. Recording tracks 35 are to be formed on the magnetic sheet 34 in a manner as shown in phantom in FIG. 1.

A DPSK (differential phase shift keying) circuit 36 is arranged to record an ID signal which is produced from the main controller 20 indicating which of the audio and video signals is being recorded. A recording amplifier 37 is arranged to amplify the frequency modulated signal and to supply the amplified signal to the head 33. The switch circuit 38 is arranged to connect the head 33 either to the recording amplifier 37 or to a reproduction amplifier 39. The reproduction amplifier 39 is arranged to amplify a signal reproduced by the head 33. Another switch circuit 40 is arranged to connect the output terminal of the reproduction amplifier 39 to a frequency demodulation circuit 47 in reproducing an audio signal or to another frequency demodulation circuit 43 in the case of reproducing a video signal. An adder 41 is arranged to add together a recording signal and the output of the DPSK circuit 36. The above stated frequency demodulation circuit 43 is arranged to frequency demodulate the signal reproduced and produced from the reproduction amplifier 39. A processing circuit 44 is arranged, for example, to clamp the frequency demodulated signal from the circuit 43 to make color difference signals coincide with each other. An encoder 45 is arranged to convert the signal processed by the circuit 44 into a composite signal such as an NTSC signal. A monitor 46 is arranged to reproduce the signal from the encoder 45. A frequency demodulation circuit 47 is arranged to frequency demodulate the output of the reproduction amplifier 39. An A/D converter 48 is arranged to A/D convert the signal demodulated by the circuit 47. A RAM 49 is arranged to store the A/D converted signal. A D/A converter 50 is arranged to D/A convert a signal read out from the RAM 49 under the control of the main controller 20. Time base expansion is arranged to be carried out by changing the speed of reading and writing actions on the RAM 49.

A speaker 51 is arranged to reproduce in the form of sounds the signal D/A converted by the D/A converter 50. A filter 53 is arranged to filter a signal which is modulated by the DPSK circuit 36 and is multiplexed with the reproduced signal obtained from the reproduction amplifier 39. A demodulation circuit 54 is arranged to DPSK demodulate the output of the filter 53. A magnetic sheet presence/absence detection circuit 56 is arranged to detect the presence or absence of the magnetic sheet 34 through the output of photo-couplers 56A and 56B. An envelope detection circuit 57 is arranged to detect whether a reproduction output is obtained from a recorded track of the magnetic sheet 34. A back lid 68 is arranged to be opened and closed in inserting the magnetic sheet 34 into the recording apparatus.

An external terminal 69 is arranged to produce an output signal. A recording/reproduction mode selection switch 101 is arranged, for example, to turn on in selecting the recording mode and to turn off in selecting the reproduction mode. A recording mode selection switch 102 is arranged, for example, to turn on in selecting an audio signal recording mode and to turn off in selecting a mode of recording a video signal only. An audio signal compression rate setting switch 103 is arranged to change one audio signal compression rate over to another rate every time the switch 103 turns on. In the audio recording mode, the track number display of the display part 24 is changed from a display state (i) of FIG. 4 over to an audio recordable time length display state (ii) as shown in FIG. 4 when the switch 103 is turned on once. After that, the display state of the display part 24 cyclically varies in the order of display states (ii)-(iii)-(iv)-(ii) as shown in FIG. 4.

A release switch 104 is arranged to be operated in two steps to serve as a trigger switch in the recording mode and as a change-over switch for change-over between the start and end of a reproducing operation in the reproduction mode. An UP switch 105 is arranged to shift the head 33 toward the inner edge of the sheet to an extent corresponding to one track width. A DOWN switch 106 is arranged to shift the head 33 toward the outer edge of the sheet by one track width at a time. A remaining amount display switch 107 is arranged to cause the display part 24 to display the amount of recordable room remaining on the magnetic sheet 34. A selection switch 108 is arranged to permit selection between a field mode and a frame mode.

Figure 7A:
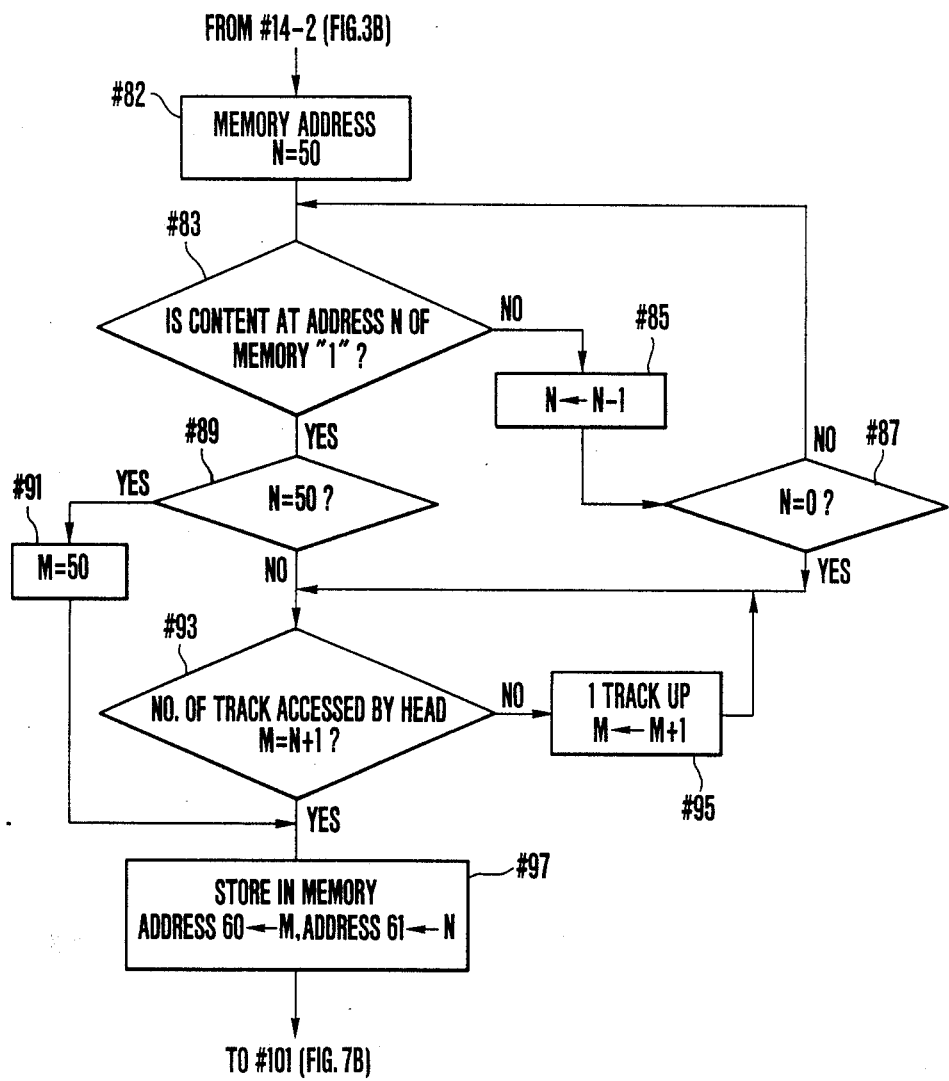

The embodiment which is arranged as described above operates as described below with reference to FIGS. 3A to 3D, which are flow charts showing the steps of operation of the main controller 20 shown in FIG. 1:

Step #1: When the release switch 104 of FIG. 2 is pushed in to a first step position thereof, the presence or absence of the magnetic sheet 34 is first detected by checking the output of the magnetic sheet presence/absence detection circuit 56. If the sheet 34 is thus found to be absent, the flow of operation proceeds to a step #2. If the sheet 34 is found to be present, the flow branches to a step #3. Step #2: An IRQF (initialize request flag) is reset (set at 0). Step #3: The position of the switch 101 is checked for a discrimination between the recording mode and the reproduction mode. If it indicates the recording mode, the flow comes to a step #4. In the case of the reproduction mode, the flow branches out to a step #51. Step #4: A check is made to see if the IRQF is set. If so, the flow branches out to a step #26. If not, the flow comes to a step #5. Step #5: The output of the magnetic sheet presence/absence detection circuit 56 is checked to find if the magnetic sheet 34 is present. If not, the flow comes back to the step #1. If so, the flow proceeds to a step #6. Step #6: The track position control circuit 21 is caused to drive the motor 31 in such a way as to bring the head 33 to a track No. 0 which is located on the outer side of a first track. Step #7: A check is made to see if the track to which the head 33 has had access is a 50th track. If so, the flow branches out to a step #12. If not, the flow comes to a step #8. Step #8: With the track accessed by the head 33 having been found to be not the 50th track at the step #7, the flow comes to this step to shift the position of the head 33 inward by one track width. Step #9: The connecting position of the switch circuit 38 is shifted to the reproduction amplifier 39. A reproducing operation is tentatively performed and the output of the envelope detection circuit 57 is checked to see whether the track accessed by the head 33 has been recorded or not. Step #10: If the track is found vacant (or not recorded) at the step #9, the bit of a track memory corresponding to the track number of the track accessed by the head 33 is changed to "0." For example, if the track No. of the track accessed by the head 33 is "10", the tenth bit of the track memory which is disposed within the main controller 20 is set at "0." Step #11: With the track found at the step #9 to have been recorded, the bit of the track memory corresponding to the track number of the track accessed by the head 33 is set at "1". Step #12: With the track accessed by the head 33 detected at the step #7 to be the 50th track, the recorded and unrecorded states of all the tracks on the magnetic sheet 34 are considered to have been stored by the track memory. Therefore, the IRQF is set and the flow of operation comes to a step #26. Further, the detection of the states of tracks is arranged to be performed by the track position control circuit 21. Step #26: In case that all the bits of the track memory are at "1"]thus indicating no vacant track, the flow of operation proceeds to a step #27. If there is any vacant track, the flow branches out to a step #13. Step #27: The display part 24 is caused through the display controller 23 to make, for example, a blinking display "PP" indicating an unrecordable state. Step #13: The head 33 is caused to have access to the outermost vacant track existing on the magnetic sheet 34. Step #14-1: The display part 24 is caused via the display controller 23 to display the track number of the track accessed by the head 33. Step #14-2: A check is made for a remaining amount display mode by checking the remaining amount display switch 107 to see if the switch 107 is on. If so, the flow of operation shown in FIG. 7A is executed. If not, the flow proceeds to a step #15. Step #15: The position of the switch 102 is checked to see if the apparatus is in the audio recording mode or in the video recording mode. The flow of operation proceeds to a step #16 if the apparatus is in the audio recording mode or branches out to a step #28 in the case of the video recording mode.

Step #16: In the audio recording mode, the display part 24 is caused to display an audio signal recordable length of time, for example, as shown at the part (ii) of FIG. 4 instead of the track number display. In this instance, to indicate that an audio signal compression rate can be set, the display controller 23 is driven to cause the display part 24 to make the display in a blinking manner. Step #17: A discrimination is made between the on- and off-states of the audio signal compression rate setting switch 103. If the switch 103 is found to be on, the flow proceeds to a step #18. If not, the flow branches out to a step #20.

Step #18: A check is made to see if the switch 103 which was found to be on at the step #17 has turned off, that is, to see if the finger of the operator has detached from the switch 103. If the switch 103 is thus found to have been turned off, the flow of operation proceeds to a step #19. Step #19: The count value of the audio signal compression rate counter is incremented. The operation of this counter in relation to the display to be made by the display part 24 is as described below:

The counted value of the audio signal compression rate counter is incremented every time the audio signal compression rate setting switch 103 turns on. When the switch 103 is turned on with the counted value of the counter at "2", the counted value comes back to "0". The counter is thus arranged to be a ring counter. The display is made in the manner as shown at the part (ii) of FIG. 4 if the counted value of the counter is at "0"; in a manner as shown at the part (iii) of FIG. 4 if the counted value is at "1"; and in a manner as shown at the part (iv) of FIG. 4 if the counted value is at "2".

The display (ii) of FIG. 4 indicates that the time compression rate of the audio signal is 1280 times and that the sound recordable period of time is 20 sec. The display (iii) of FIG. 4 indicates that the time compression rate of the audio signal is 640 times and the sound recordable period of time is 10 sec. The display (iv) of FIG. 4 indicates that the time compression rate of the audio signal is 320 times and the sound recordable period of time is five sec. The speeds of writing and reading actions on the RAMs 13 and 49 are controlled according to these time compression rates.

Figure 3A:
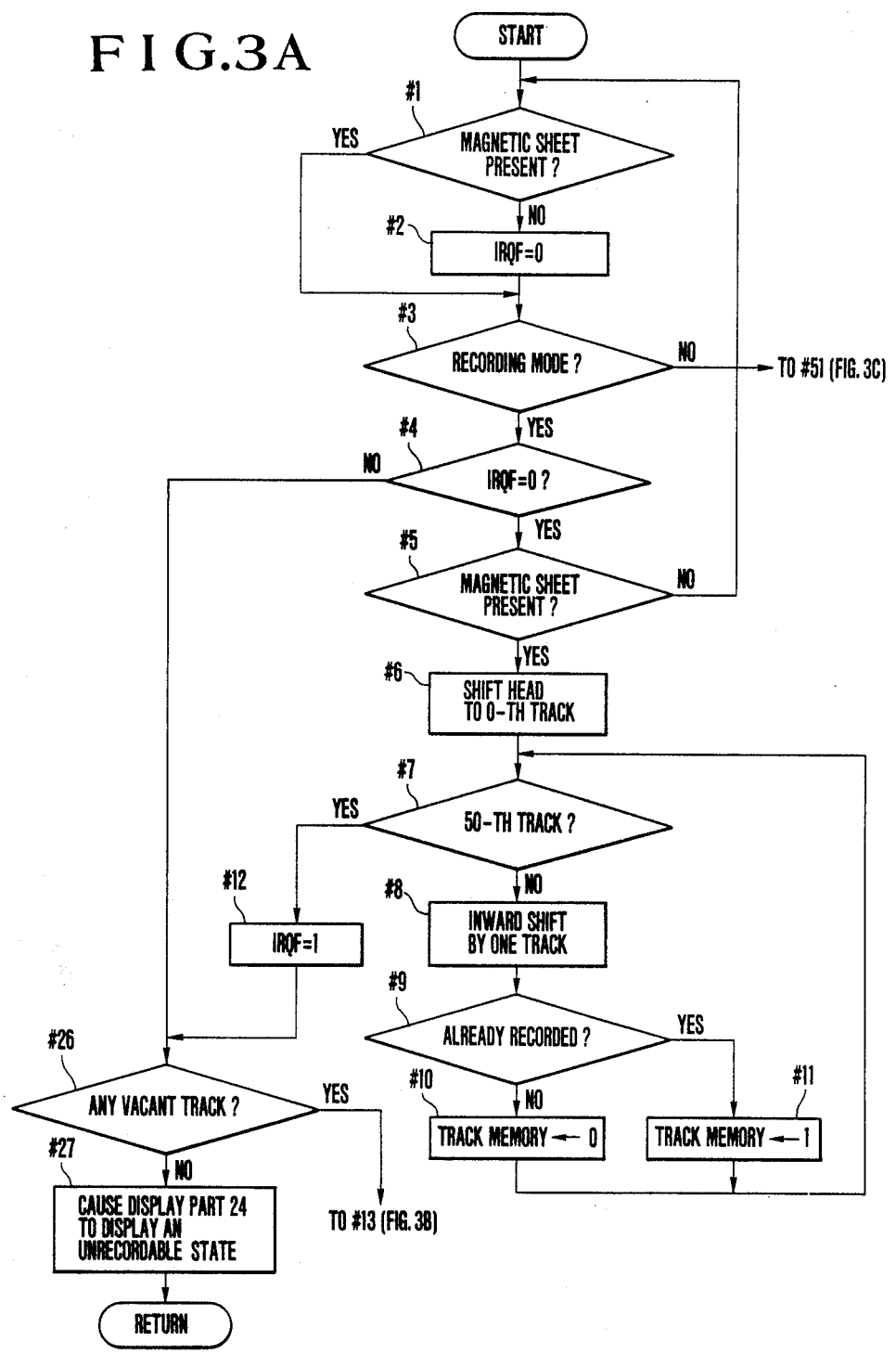
FIGS. 3A to 3D are flow charts showing the operation of a main controller 20 which is included in FIG. 1.
Figure 3B:
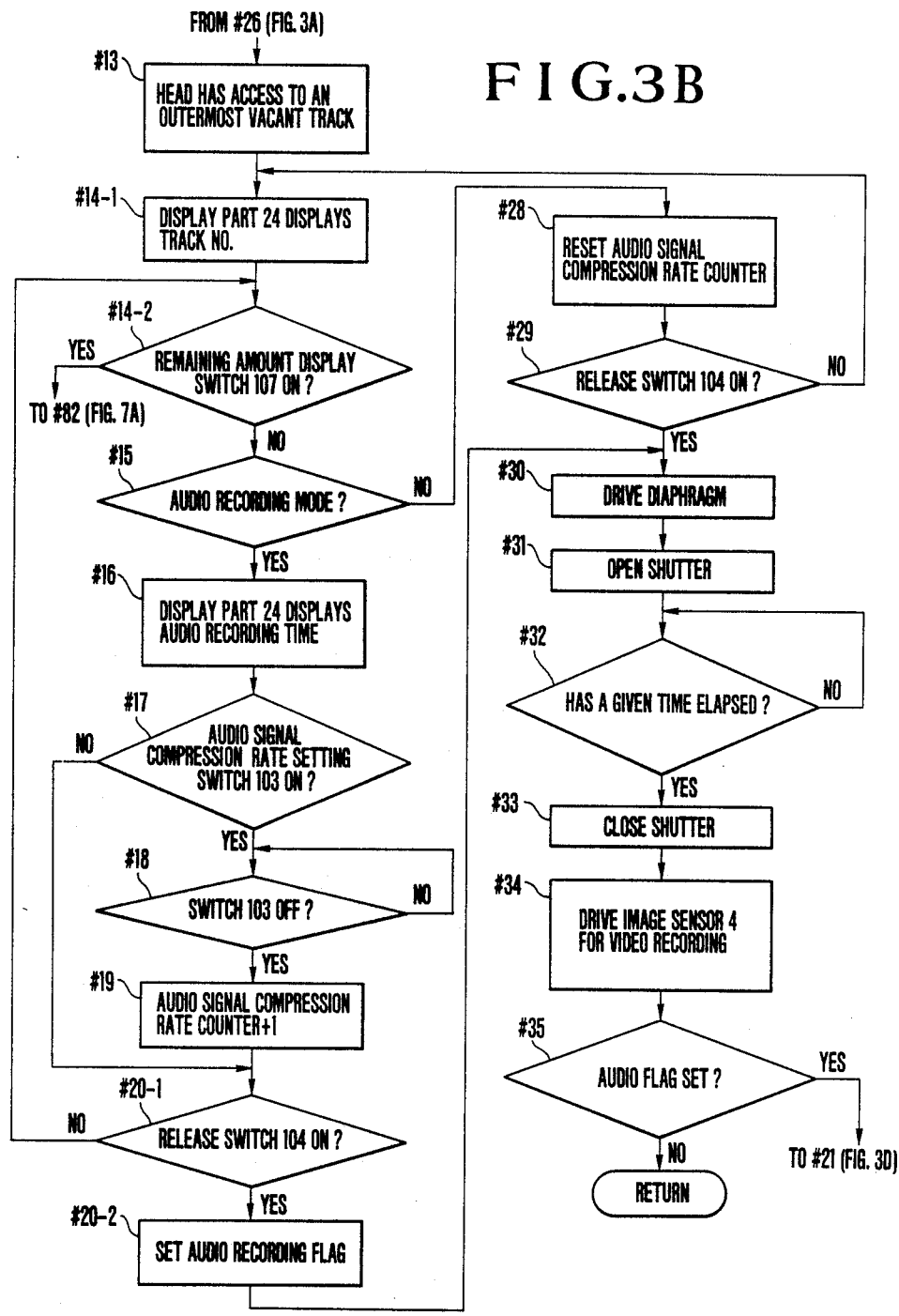
Figure 3C:
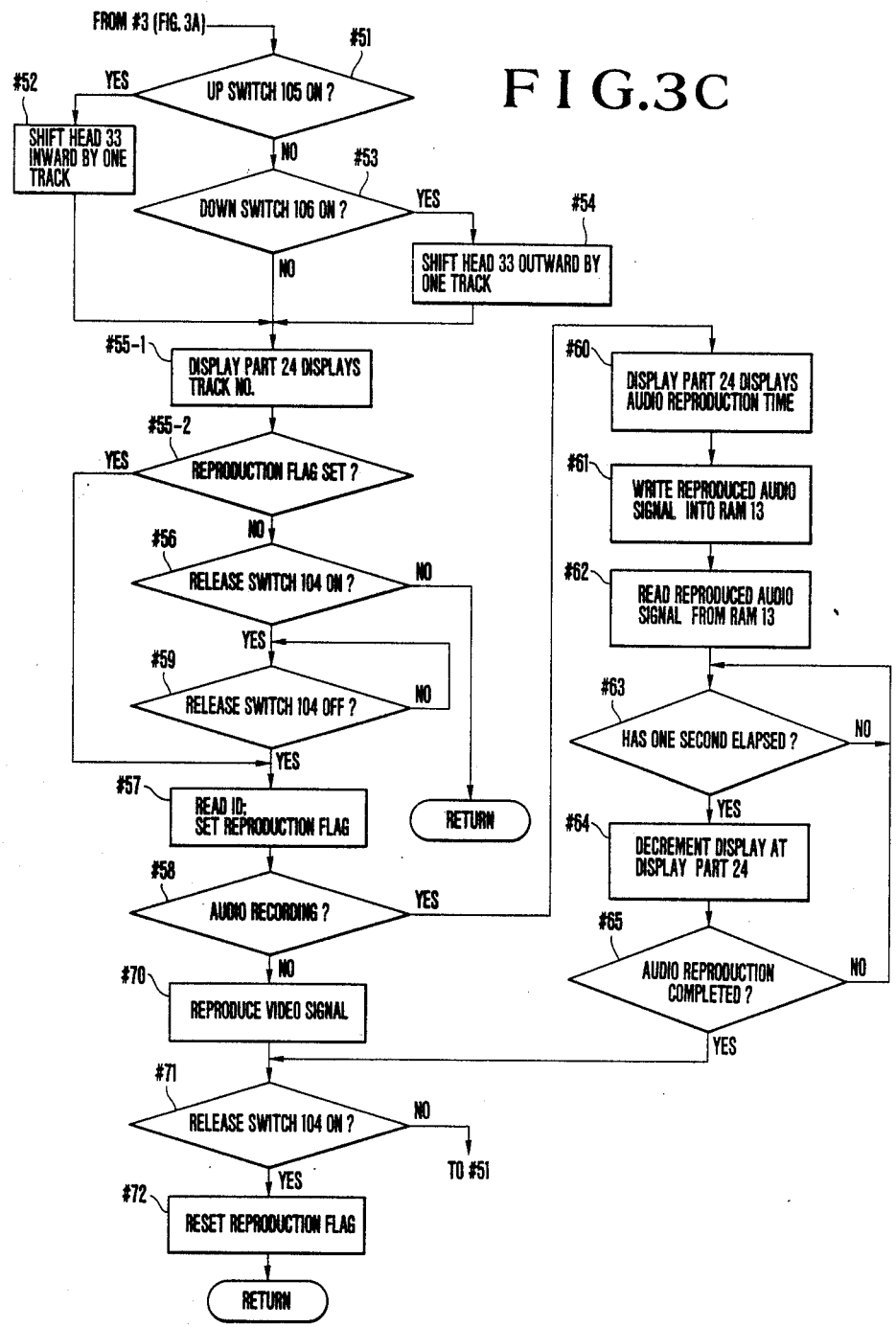
Figure 3D:
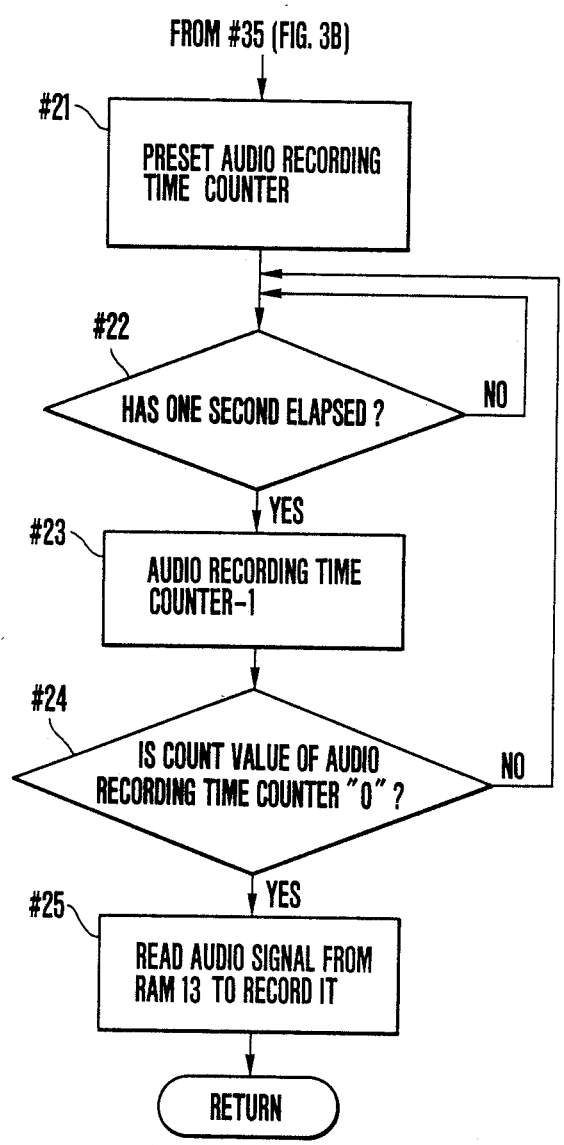

Step #20-1: A check is made for the position of the release switch 104 to find if it is pushed to the second stroke position thereof. If so, the flow of operation proceeds to a step #20-2: If not, it branches out to a step #14-2. Step #20-2: The audio recording flag is tentatively set and then the flow branches to a step #30 to have steps #30 to #34 executed. The video signal is then recorded on the magnetic disc 34. After that the flow of operation branches from a step #35 to a step #21 which is shown in FIG. 3D. Step #21: The audio signal recording time counter is preset at a counted value corresponding to the compression rate set at the steps #16 to #20-2. The reset value is displayed at the display part 24. Step #22: A check is made for the lapse of one sec. This step is repeated until the lapse of one sec. The flow proceeds to a step #23 after the lapse of one sec. Step #23: The counted value of the audio signal recording time counter is decremented. The display controller 23 acts to cause the display part 24 to display the counted value of the audio signal recording time counter. Therefore, when the release switch 104 is pushed down to its second stroke position, the value displayed by the display part 24 becomes a remaining length of time available for recording the audio signal. Further, while the display of the display part is blinking when the audio signal compression rate is set at steps #16 to #19, the blinking display of the display part 24 ceases to blink and changes to a lit display indicating that audio recording is in process.

Step #24: A check is made for the counted value of the audio recording time counter to see if it is at "0". If so, the flow proceeds to a step #25. If not the flow comes back to the step #22. Step #25: The switch circuit 7 is connected to the frequency modulation circuit 15 and the switch circuit 38 to the head 33. The audio signal stored at the RAm 13 is read out at a high speed in such a way as to have the audio signal recorded in one track. In other word, the whole signal stored at the RAM 13 is completely read out during one turn of the magnetic sheet 34. The audio signal is thus recorded on the magnetic sheet 34 in a time base compressed state.

As described in the foregoing, in the audio recording mode, the video signal is recorded when the release switch 104 is turned on and, following that, the audio signal which has been written in the RAM 13 is recorded in a track located adjacent to a track in which the video signal is recorded. In this instance, therefore, an area corresponding to two tracks is necessary. In the case of the frame recording mode, a total of three tracks are necessary including two tracks for the video signal and one for the audio signal. Further, at this step, each bit of the track memory corresponding to the recorded track is set.

While the operation of the main controller in the audio recording mode is as described above, the operation with the video recording mode selected by the switch 102 is as described below:

Step #28: The audio signal compression rate counter is reset. Step #29: A check is made for the position of the release switch 104. The flow of operation comes to a step #30 when the release switch 104 is detected to have been pushed down to its second step position. If not, the flow branches out to the step #14-1. Step #30: The diaphragm 2 is stopped down to a given aperture value position according to the output of a light measuring circuit which is not shown. Step #31: The image sensor 4 is exposed to light by opening the shutter 3 for a given period of time. Step #32: A check is made for the lapse of a shutter time determined by the output of the light measuring circuit and the stopped down value of the diaphragm. The flow of operation comes to a step #33 after the lapse of the shutter time. Step #33: The shutter 3 is closed. Step #34: The switch circuit 7 is connected to the frequency modulation circuit 6 and the switch circuit 38 to the head 33. At the same time, the image sensor 4 is driven to obtain a photoelectric conversion signal. This signal is processed by the signal processing circuit 5 and is then frequency modulated by the frequency modulation circuit 6. The signal from the circuit 6 is recorded on the magnetic sheet 34 by the head 33. In case that the field recording mode has been set by the switch 108, the signal is recorded only in one track without shifting the head 33. If the frame recording mode has been selected by the switch 108, the signal is recorded in two tracks by shifting the head 33. Further, at this step, a bit of the track memory corresponding to the recorded track is set. Step #35: A check is made for the audio recording flag to see if it is set. If so, this flag is reset. After that, the flow of operation shown in FIG. 3D is executed.

These steps are executed in case that the remaining amount display mode is not selected by the switch 107. However, in the event of the remaining amount display mode, the flow of operation becomes as follows: The flow, in that event, branches out from the step #14-2 to the steps of FIG. 7A. Referring to FIGS. 7A and 7B, the operation of the main controller 20 is then performed as follows: Step #82: The position of a register N which is provided for reading out from each address of the track memory is set at 50. In other words, the register N is set at an address indicative of the innermost track of the magnetic sheet 34. Step #83: A check is made for the content of an address N of the memory to see if it is at "1". If so, the flow of operation comes to a step #89. If not, the flow branches out to a step #85: One is subtracted from the content of the register N. Step #87: A check is made to see if the register N is at "0". If so, the flow of operation comes to a step #93. If not, it comes back to the step #83. Step #89: With the address N of the track memory found at the step #83 to be at "1", a check is made to see if a register N is at 50 thus indicating that the innermost track is a recorded track. If so, the flow of operation branches to a step #91. Step #91: With the innermost track found at the step #89 to have been recorded, a register M is set at 50. Step #93: With the register N found at the step #89 to be not 50, a check is made to see if the register M which indicates the track number of a track accessed by the head 33 is at a value coinciding with (N+1). Further, since the head 33 has access to the outermost vacant track at the step #13 before this step, the two values normally coincide with each other. Step #95: If the above stated two values do not coincide with each other at the step #93, the head 33 is shifted further inward by one step to have the step #93 again executed. Step #97: With the above stated two values found at the step #93 to coincide with each other, the content of the register M is written into the address 60 of the track memory and that of the register N into the address 61 of the track memory.

With the steps executed up to the step #97, the track number of a vacant track which is located in the outermost part among consecutive vacant tracks within an area which remains unrecorded continuously from the innermost part is written in the register N and the address 61 of track memory. Meanwhile, the track number of a recorded track which is located in the innermost part among the recorded tracks on the magnetic sheet 34 is written in the register M and the address 60 of the track memory.

Further steps beginning with a step #101 which are to be executed after the step #97 are as described below with reference to FIG. 7B:

Step #101: Registers P and L are set at "0" and "1" respectively. Step #103: A check is made for the value of the address 61 of the track memory to see if it is at "50", i.e. to find whether the innermost track of the magnetic sheet 34 has been recorded. If so, the flow of operation branches out to a step #102. If not, the flow comes to a step #105. Step #105: The position of the switch 108 is checked to make a discrimination between the frame and field recording modes. The flow of operation comes to a step #106 in case that the apparatus is set in the frame mode and to a step #107 if the apparatus is set in the field mode. Step #106: The register L is incremented by "1". Step #107: The audio/video selection switch 102 is checked to see if the audio recording mode has been selected. If so, the flow proceeds to a step #108. Step #108: The register L is further incremented by "1". Step #109: The following computing formula is carried out and the result of computation is written into a register S, with any fraction discarded:

$$S = (50 - \text{data of address 61 of track memory}) / 2$$

Step #111: The register P is set at "1". Step #113: The display part 24 is caused to display the content of the register S. Step #115: The register P is checked to see if it is set at "1". If so, the flow comes to a step #117. If not, the flow comes to a step 121. Step #117: The register S is checked to see if it is at "0". If so, the flow comes to a step #119. If not, the flow branches out to a step #121. Step #119: That the register S is at "0" means either that the innermost track has already been recorded or that, in case where a recording mode designated by the switches 102 and 108 is carried out, a necessary number of tracks are not left on the magnetic sheet 34. In this instance, a blinking display of "0" is made indicating an unrecordable state. Step #121: The flow of operation waits there for a period of two seconds. Step #123: The remaining amount display switch 107 is checked to see if it has been turned on. If so, this step #123 is repeated until the switch 107 is turned off. After the switch is turned off, the flow comes to a step #125. Step #125: The display of the display part 24 is brought back to its original display state and then the flow comes to the step #15.

Figures 1, 7C:
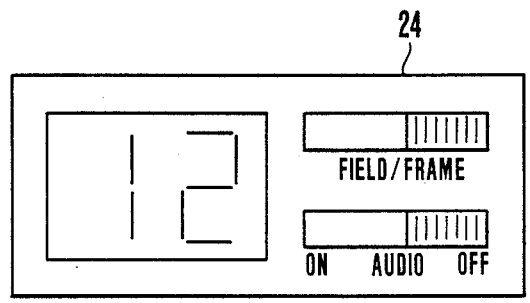
Figures 2, 7C:
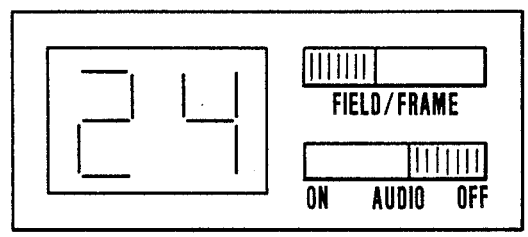
Figures 3, 7C:
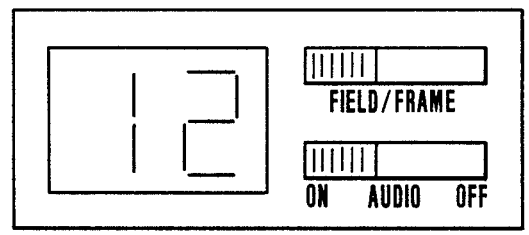
Figures 4, 7C:
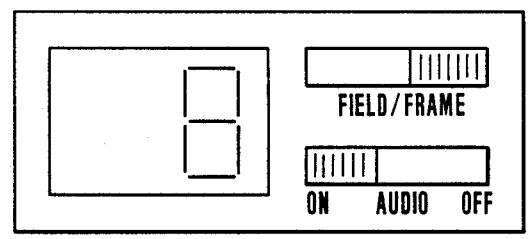
Figures 5, 7C:
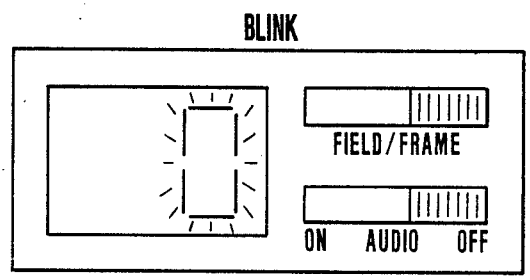
Figures 6, 7C:
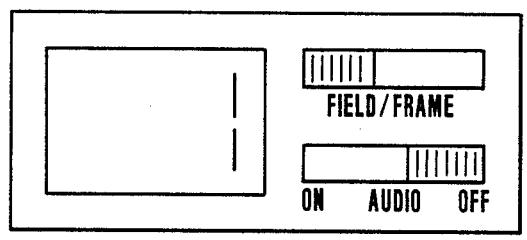

With the above stated flow of operation executed, the amount of room left for recording on the magnetic sheet 34 is displayed. FIGS. 7C-1 to 7C-8 show by way of example the manners in which the displays are made. FIGS. 7C-1 to 7C-4 show the displays made when the remaining number of vacant tracks is 24. Of these drawings, FIG. 7C-1 shows a case where the remaining number of tracks is 24 or 25 in the frame mode with the audio recording not selected. FIG. 7C-2 shows a case where the remaining number of tracks is 24 in the field mode with the audio recording not selected. FIG. 7C-3 shows a case where the remaining number of tracks is 24 or 25 in the field mode with the audio recording selected. FIG. 7C-4 shows a case where the remaining number of tracks is 24 or 26 in the frame mode with the audio recording selected.

Figure 6:
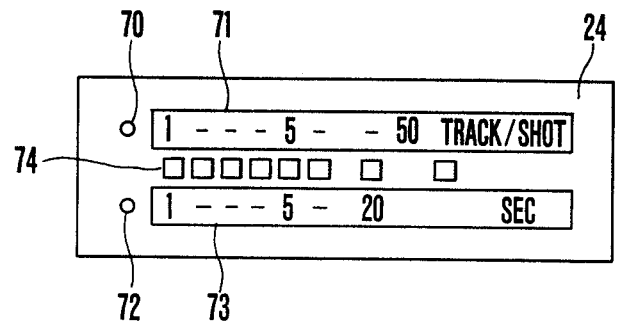
FIG. 6 is a plan view showing a third example of displays made by the display part 24.
Figure 5:
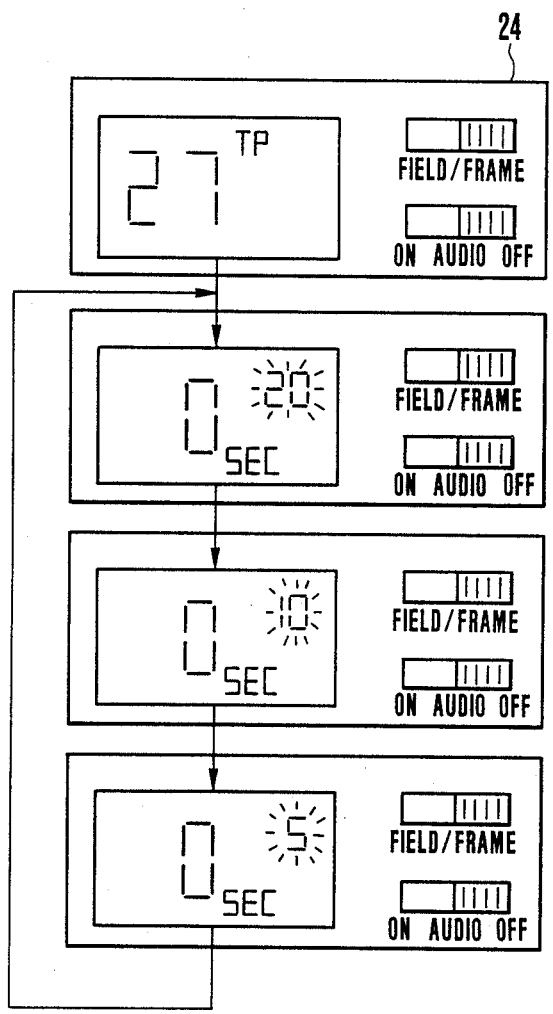
FIG. 5 is a plan view showing a second example of displays made by the display part 24.
Figures 7, 7C:
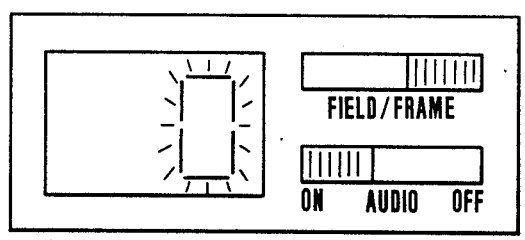
Figures 7, 7C, 8:
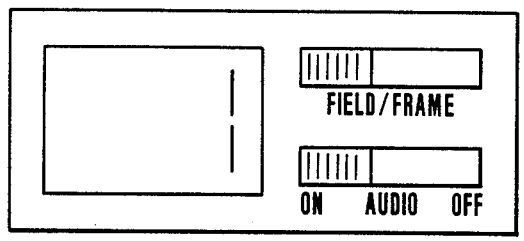

FIGS. 7C-5 and 7C-6 show the displays made when the remaining number of vacant tracks is one. Of these drawings, FIG. 7C-5 shows a case where the frame mode without audio recording is selected. FIG. 7C-6 shows a case where the field mode without audio recording is selected. FIGS. 7C-7 and 7C-8 show the displays made when the remaining number of vacant tracks is 2. Of these drawings, FIG. 7C-7 shows a case where the frame mode is selected with audio recording while FIG. 7C-8 shows a case where the field mode is selected with audio recording. As apparent from FIGS. 7C-1 to 7C-8, the remaining number of vacant tracks is displayed as it is in cases where the field mode is selected with audio recording not selected (see FIGS. 7C-2 and 7C-6). The remaining number of vacant tracks is displayed in a value obtained by dividing it by 2 in cases where the field mode is selected with audio recording also selected or where the frame mode is selected without audio recording (see FIGS. 7C-1, 7C-3, 7C-5 and 7C-8). The remaining number of vacant tracks is displayed in a value obtained by dividing it by 3 in cases where the frame mode is selected with audio recording also selected (see FIGS. 7C-4 and 7C-7).

Further, in each of these cases, if the quotient obtained by dividing the remaining number of vacant tracks by 1 or 2 is 0, the remaining amount display is made by blinking "0" thus giving a warning that the selected recording mode cannot be executed. In case that the quotient thus obtained includes a fraction below the decimal point, the fraction is discarded for the display.

It is an advantage of this embodiment in terms of operability that, with the remaining amount display switch turned on as mentioned in the foregoing, the remaining amount of room for recording can be displayed appositely to the recording mode selected. Especially, it is an advantageous point of the embodiment that the mode of the remaining amount display is changed according as to whether the audio recording mode is selected or not.

Further, with the audio recording mode set by means of the switches 101 and 102, the recordable length of time for audio recording is displayed at the display part 24. Then, in case that the audio signal compression rate is variable by means of the switch 103, the display by the display part 24 blinks. After commencement of the audio recording, the display part 24 displays a remaining length of the audio signal recordable time according to the lapse of time. In the case of the video recording mode, the display part 24 displays the track number of a track accessed by the head 33.

In this embodiment, the display of the track number of the track being accessed by the head 33 and the display of the remaining length of the audio signal recordable time can be made by one and the same display device. Further, the display corresponding to the audio signal compression rate is also arranged to be made by the same display device. However, the arrangement of the display part 24 may be changed as shown in FIG. 5. In this case, while the display of the recordable length of time for audio recording and the track number display for the track accessed by the head 33 are arranged to be made by one and the same display device, the display corresponding to the audio signal compression rate is arranged to be made by another display part.

While the operation to be executed in the recording mode which is set by the recording/reproduction mode selection switch 101 is as described in the foregoing, the operation to be executed when the reproduction mode is set by the switch 101 is as follows: In the reproduction mode, the flow of operation branches out from the step #3 of FIG. 3A to a step #51 of FIG. 3C.

Step #51: With the reproduction mode selected, the UP switch 105 is first checked to see if it is on. If so, the flow of operation proceeds to a step #52. If not, the flow comes to a step #53. Step #52: The head 33 is shifted inward by one track width. Step #53: The DOWN switch 106 is checked for its on-state. If it is on, the flow comes to a step #54. If not, the flow comes to a step #55-1. Step #54: The head 33 is shifted outward by one track width. Step #55-1: The display part 24 is caused to display a track number. Step #55-2: A check is made for the set state of the reproduction flag. If it is set, the flow comes to a step #57. If not, the flow proceeds to a step #56. Step #56: A check is made to find if the release switch 104 has been pushed to the second step position thereof. If not, the flow comes back to the start. If the switch 104 is found to have been pushed to the second step position, the flow comes to a step #59 to detect that the release switch 104 is released from the pushing operation thereon. After this detection, the flow proceeds to a step #57. Step #57: The connecting position of the switch circuit 38 is shifted to the reproduction amplifier 39. The ID signal which is demodulated through the filter 53 and the DPSK demodulation circuit 54 is read out. The reproduction flag is set. The state of the reproduction flag is detected at the step #55-2. Step #58: The ID signal read out at the step #57 is checked to see if the audio signal is being recorded. If so, the flow comes to a step #60. If not, the flow comes to a step #70. Step #60: The display part 24 is caused to display a reproducing length of time according to the reproduced audio signal compression rate on the basis of the above stated ID signal. For example, the display part 24 makes a display as shown at the part (ii) of FIG. 4 if the audio signal compression rate is 1280 times, a display as shown at the part (ii) if the rate is 640 times or a display as shown at the part (iv) of FIG. 4 if the rate is 320 times. This display is made in a blinking manner.

Step #61: The position of the switch circuit 40 is shifted to the frequency demodulation circuit 47. The signal reproduced by the head 33 is thus controlled to be supplied to the frequency demodulation circuit 47. The reproduced audio signal is then written into the RAM 49 within a period of time which is required for one turn of the magnetic sheet 34 and is very short. Step #62: The signal written into the RAM 13 at the step #61 begins to be read out at a speed corresponding to the audio signal compression rate. The audio signal thus read out is reproduced through the D/A converter 50 by means of either the speaker 51 or the monitor 46. Step #63: The audio signal stored at the RAM 13 continues to be read out. A check is made for the lapse of one sec. When the lapse of one sec is detected, the flow of operation proceeds to a step #64. Step #64: The value displayed by the display part 24 is decremented to show the lapse of the remaining time for reproduction of the audio signal. Step #65: A check is made for completion of reading from the RAM 13. If the reading process has not been completed, the flow comes back to the step #63. If it is found completed, the flow comes to a step #71. Then, if the release switch 104 is found not pushed to the second step position thereof at the step #71, the flow comes back to the step #51.

The main controller 20 controls writing and reading into and from the RAM 49. Completion of reading is detected by checking the state of a reading control counter which is disposed within the main controller 20.

Further, when completion of audio recording is not detected at the step #58, a step #70 and ensuing steps are executed.

Step #70: The position of the switch circuit 40 is shifted to the frequency demodulation circuit 43. The signal reproduced by the head 33 is demodulated by the frequency demoduction circuit 43 and is processed by the reproduction processing circuit 44. The output of the circuit 44 is converted into a composite TV signal by the encoder 45 and is supplied via an external monitor terminal 69 to the monitor 46. Step #71: The release switch 104 is checked to see if the switch 104 has been again turned on. If not, the flow of operation comes back to the step #51 to repeat the above stated actions. Further, since the reproduction flag is set at the step #57 after commencement of the reproducing operation, the steps #56 and #59 are not executed. Therefore, after the reproduction flag is set, the access postiion of the head 33 can be freely adjusted by operating the UP and DOWN switches 105 and 106. Step #72: When the release switch 104 is pushed to the second step position thereof, the reproduction flag is reset and the reproducing operation is brought to a pause. The flow of operation then comes back to the start thereof.

In the embodiment described, when the release switch 104 is pushed down to its second step position after the reproduction mode is set by means of the switch 101, the reproducing operation begins. Then, the ID signal is detected from the output of the head 33 which has its access position arranged to be shiftable by means of the UP and DOWN switches 105 and 106. Whether the signal recorded in the track accessed by the head 33 is a video signal or an audio signal is discriminated through the ID signal thus detected. The display mode of the display part 24 is changed according to the result of this discrimination. Further, in case that the record in the track is an audio signal, the display part 24 makes a display corresponding to the compression rate of the audio signal.

In reproducing an audio signal, the remaining reproducible time is arranged to automatically vary and is displayed according as the reproduction proceeds.

Further, in this embodiment, the lapse of audio recording time is displayed as the remaining time for recording in the recording mode and likewise as the remaining time for audio recording in the reproduction mode. These remaining time displays are arranged to be made by one and the same display device. However, these displays of course may be replaced with a display of the length of a recording time lapsed and a display of the length of a reproduction time lapsed respectively.

Further, in this embodiment, the display part 24 is arranged to make a two-place display with seven-segment display elements. However, this arrangement may be changed. For example, the display part 24 may be arranged as shown in FIG. 6. In this case, the display part 24 comprises: Indexes 71 and 73; display elements 74 which are LEDs or the like; and display elements 70 and 72 which are provided for discriminating the content of a display made by the display element 74. The display element 72 is allowed to light up in the case of audio recording or reproduction. The display elements 74 then may be arranged to light up one after another beginning with one disposed in the position of an index "1" included in the indexes 73 accordingly as the audio recording or reproducing time lapses. In another possible mode of display, all the display elments 74 are arranged to light up at the start of audio recording or reproduction and then to be put out one after another beginning with one of them disposed in the position of an index "20" included in the indexes 73. In recording or reproducing a video signal, the display element 70 is allowed to light up. One of the display elements 74 disposed in the position of an index which, among the indexes 71, corresponds to the track number of a track being accessed by the head 33. In this instance, the remaining amount display which has been described with reference to the flow charts of FIGS. 7A and 7B may be arranged to be made by allowing a mark "SHOT" shown in FIG. 6 to light up when the remaining amount display switch 107 is turned on.

In the embodiment described, the display device for the remaining amount display is arranged to be used also for displaying the track number, audio time and the length of audio recording time lapsed. However, another display device may be discretely arranged for the purpose of making the remaining amount display. It is also possible to have the remaining amount display device arranged to perform the combined display function only for some of the above stated displays.

The recording apparatus according to this invention excels in operability as the amount of room for recording left on the recording medium can be displayed in varied manner according to whether audio recording is required or not.

What is claimed is:

1. A recording apparatus having selectable modes of recording in storing means, including a first mode of recording at least sound or audio information and a second mode of recording information other than said audio information, comprising:

(a) detecting means for detecting an amount of unrecorded part in said storing means for recording; and (b) control means for varying the mode of displaying the amount of unrecorded part in said storing means in accordance with a selection made between said first and second recording modes.

2. An apparatus according to claim 1, further comprising:

(c) display means having a display state controlled by said control means.

3. An apparatus according to claim 1, wherein said storing means is a recording medium.

4. An apparatus according to claim 3, wherein said recording medium is in a disc like shape.

5. An apparatus according to claim 1, wherein said first recording mode is a mode of recording an audio signal and a video signal in said storing means; and said second recording mode is a mode of recording a video signal without recording any audio signal.

6. An apparatus according to claim 5, wherein said storing means is a disc-shaped recording medium; said first recording mode is a mode of recording an audio signal and a video signal respectively in different concentric tracks on said disc-shaped recording medium; and said second recording mode is a mode of recording only a video signal in said concentric tracks on said disc-shaped recording medium.

7. An apparatus according to claim 2, wherein said display means is arranged to display a remaining amount for recording within said storing means in said first recording mode and a remaining amount for recording in said second recording mode.

8. An apparatus according to claim 7, further comprising:

(c) change-over means for making a selection between said first and second recording modes.

9. An apparatus according to claim 8, further comprising:

(d) display means for displaying the selecting state of said change-over means.

10. A recording apparatus capable of recording one of an audio signal and a video signal in each of a plurality of storing blocks provided on storing means, comprising:

(a) detecting means for detecting a value corresponding to unrecorded storing blocks of said storing means;

(b) change-over means for making a selection between a first recording mode in which said audio signal and said video signal are recorded in different recording blocks of said storing means and a second recording mode in which only one of said audio and video signals is recorded; and (c) supply means for supplying a value detected by said detecting means to a display device, said supply means being arranged to vary the operating manner thereof according to the selection made by said change-over means.

11. An apparatus according to claim 10, wherein said detecting means is arranged to detect the number of storing blocks that have no signal recorded therein within said storing means.

12. An apparatus according to claim 10, wherein said change-over means includes a manually operable member and is arranged to select said first recording mode or said second recording mode according to the state of said member.

13. An apparatus according to claim 10, further comprising a display device.

14. An apparatus according to claim 10, wherein said supply means is arranged to cause said display device to display the value detected by said detecting means when said second recording mode is selected by said change-over means and to cause said display device to display a value which is obtained by dividing the value detected by said detecting means by a given number when said first recording mode is selected by said change-over means.

15. An apparatus according to claim 14, wherein said given number is 2.

16. An apparatus according to claim 10, wherein said change-over means is arranged to be capable of further selecting a third recording mode in which one frame portion of a video signal consisting of two field portions of the video signal is recorded.

17. An apparatus according to claim 16, wherein said supply means is arranged to cause said display device to display a value which is obtained by dividing the value detected by said detecting means by a given number when said third recording mode is selected by said change-over means.

18. A recording apparatus capable of recording in combination an audio signal and a video signal in a plurality of storing blocks provided on a storing means, comprising:

(a) detecting means for detecting a value corresponding to unrecorded storing blocks of said storing means; and (b) display means for making a display corresponding to a value obtained by dividing said value detected by said detecting means by an n number (n: an integer which is at least 2).

19. An apparatus according to claim 18, wherein said detecting means is arranged to detect the amount of unrecorded storing blocks of said storing means.

20. An apparatus according to claim 18, wherein said display means is arranged to make a segmental display.

21. An apparatus according to claim 18, wherein said storing means is a recording medium.

22. An apparatus according to claim 21, wherein said storing blocks are concentric tracks formed on said recording medium.

23. An apparatus according to claim 18, wherein said n number is 2.

24. An apparatus according to claim 18, wherein said n number is 3.

25. An apparatus according to claim 18, wherein said display means is arranged to display information other than said value obtained by dividing.

* * * * *